2,809,199
PROCESS AND INTERMEDIATES FOR PREPARING RAUWOLSCINE AND DERIVATIVES

Harold Belding MacPhillamy, Madison, N. J., assignor to Ciba Pharmaceutical Products, Inc., Summit, N. J., a corporation of New Jersey No Drawing. Application January 13, 1955, Serial No. 481,719

18 Claims. (Cl. 260—286)

This invention relates to a new process for the preparation of rauwolscine, also called α-yohimbine, an alkaloid of *Rauwolfia canescens* [see Mookerjee, J. Ind. Chem. Soc. 18, 33 (1941)] and embraces also the intermediates used in the process of the invention.

Rauwolscine is an indol-alkaloid and has a carbomethoxy group and a free hydroxyl group; it can be represented by the most probable formula:

I

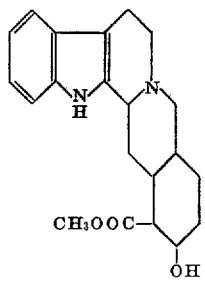

More particularly the invention relates to the process of converting alcohol esters of deserpidic acid (II), a degradation product of the alkaloid deserpidine, into rauwolscine. This process comprises replacing the free hydroxyl group present in said esters by a halogen atom, especially bromine or iodine, if desired hydrolyzing the esterified carboxyl group, reductively removing the halogen atom of the halogeno-desoxydeserpidic acid or its esters (III), respectively thus obtained so as to form desoxydeserpidic acid or esters (IV) thereof, followed by hydrolysis of any esterified carboxyl group and simultaneously or subsequently of the methoxyl group of the desoxydeserpidic acid or esters thereof (IV) and re-esterification of the free carboxyl group of the rauwolscinic acid (V) [see Mookerjee, J. Ind. Chem. Soc. 18, 33 (1941)] obtained to a carbomethoxy group so as to form rauwolscine (I). The sequence of reactions can be schematically indicated as follows, the formulae being the most probable for the compounds set forth.

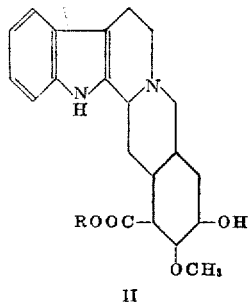
II

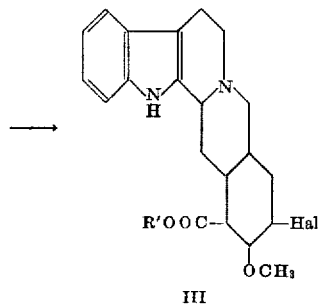
III

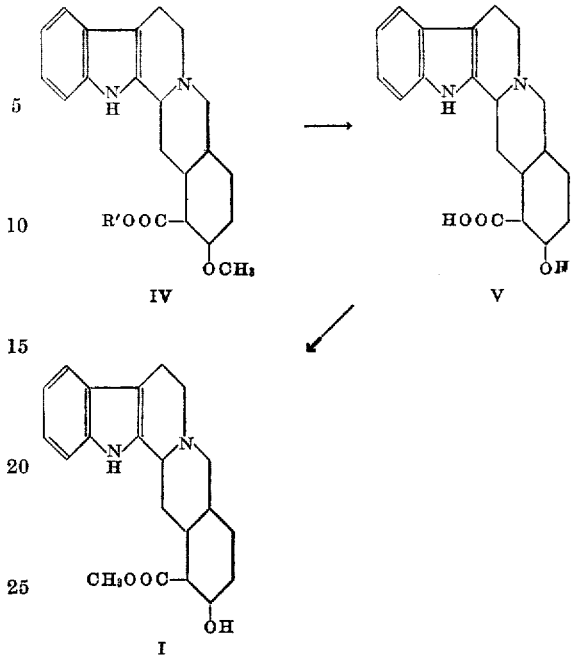

In the above formulae "R" represents the residue of an alcohol, "R'" stands for R or hydrogen and "Hal" represents a halogen atom, especially bromine or iodine.

As starting materials there are used advantageously alkyl deserpidates, such as methyl deserpidate, which can be obtained according to copending application Serial No. 471,519, filed November 26, 1954, of Paul R. Ulshafer, by degradation of the alkaloid deserpidine to deserpidic acid and subsequent esterification. Deserpidine may be obtained according to copending application Serial No. 468,161, filed November 10, 1954, of Paul R. Ulshafer. The replacement of the free hydroxyl group by a halogen atom can be accomplished directly or preferably step-wise. Thus, the free hydroxyl group of the starting material may be first converted into a hydroxyl group esterified with an organic sulfonic acid, e. g. arylsulfonyloxy, preferably p-toluene sulfonyloxy group, which may be carried out by reaction with the corresponding sulfonyl chlorides as described in the above mentioned copending application Serial No. 471,519; the sulfonyloxy group can then be replaced by reacting the compound with a metal halide, such as an alkali halide, for example, sodium, potassium or lithium bromide or iodide. This reaction is preferably carried out in an inert diluent, such as acetonitrile. The optional hydrolysis of the esterified carboxyl group at this stage of the process may preferably be carried out by treatment with alkaline hydrolyzing agents, such as aqueous alcoholic solutions of alkali hydroxides.

The reductive removal of the halogen is carried out by means of hydrogen in statu nascendi or catalytically activated hydrogen under such conditions that the free or esterified carboxyl group and the ring double bonds are not reduced, for example using zinc in the presence of acetic acid or hydrogen activated by Raney nickel. If the carboxyl group of the compounds obtained is esterified it may be hydrolyzed, for example by the above mentioned means or together with the hydrolysis of the methoxyl group which is accomplished by ether-splitting hydrolyzing agents, advantageously under acid conditions, for example, by treatment with concentrated hydrobromic or hydriodic acid. The final esterification of the rauwolscinic acid is effected by conventional means, for example by treatment with an esterifying agent capable of transforming a carboxyl group into a carbomethoxy group, especially diazomethane.

The invention extends also to those modifications of the process wherein the compounds are used and/or obtained in the form of their salts and/or wherein a compound obtainable as an intermediate product at any stage of the process for the preparation of rauwolscinic acid is used as starting material and the remaining steps are carried out. It also embraces the intermediates in the form of their salts, for example with organic or inorganic acids, such as hydrohalic acids, sulfuric acid, citric acid, ethane sulfonic acid, hydroxyethane sulfonic acid, methyl sulfuric acid, acetic, citric, oxalic or tartaric acid. The free bases may be converted into these salts in customary manner, for example by treating them with the desired acid. Embraced by the invention are also intermediates with a free carboxyl group in the form of their metal salts, such as alkali or alkaline earth metal salts, for example sodium salt, or salts with organic bases.

Rauwolscine, the final product of the above mentioned process, shows pharmacological activity useful in medicine; thus it acts as a cardiovascular depressant and an antagonist of adrenalin. Furthermore, rauwolscine is a useful intermediate for the preparation of compounds having related structure, which may be used as medicaments on account of their pharmacological activity. Thus, the free hydroxyl group of rauwolscine may be converted into the 3.4.5-trimethoxybenzoyloxy group, to which end rauwolscine may be reacted with 3,4,5-trimethoxybenzoyl chloride in pyridine as a solvent; O-3,4,5-trimethoxybenzoyl rauwolscine has a hypotensive and adrenolytic activity and can be used as a medicament for this purpose.

The following examples illustrate the invention, the relation between parts by weight and parts by volume being the same as that between the gram and the cubic centimeter and the temperatures being given in degrees centigrade.

*Example 1*

To a solution of 0.46 part by weight of methyl deserpidate (dried by distilling toluene from it twice) in 5 parts by volume of freshly distilled pyridine is added dropwise and with cooling 0.46 part by weight of p-toluene-sulfonyl chloride in 1 part by volume of dry benzene. 1 part by volume of pyridine is used to rinse the reagent into the reaction flask which is securely stoppered and allowed to stand at 5° for 5 days. The reddish solution is poured into approximately 50 parts by volume of ice and water. 12 parts by volume of 5 percent aqueous ammonia are added and the semi-solid precipitate is triturated for about 5 minutes. The mixture is then extracted with three portions of methylene chloride of 50 parts by volume, 15 parts by volume and 10 parts by volume. The combined methylene chloride extracts are washed three times with small portions of a cold sodium chloride solution, dried over anhydrous potassium carbonate and evaporated in vacuo to a semi-crystalline residue. 0.63 part by weight of this is dissolved in methylene chloride, filtered through approximately 0.02 part by weight of activated charcoal on a diatomaceous earth filter cell, evaporated and crystallized from 4 parts by volume of benzene. Additional material is obtained from the benzene mother liquors. Recrystallization from methanol gives O-(p-toluenesulfonyl)-methyl deserpidate, melting at 226–228°.

2 parts by weight of p-toluene sulfonyl methyl deserpidate and 2 parts by weight of sodium iodide are refluxed in 40 parts by volume of dry acetonitrile overnight and then the sodium p-toluene sulfonate formed is filtered off. The filtrate is evaporated to dryness and the residue taken up in chloroform and water. The aqueous phase is extracted three times with chloroform, the combined chloroform extracts are washed with water and then evaporated to dryness. The residue represents methyl iododesoxydeserpidate; it has the empirical formula $C_{22}H_{27}O_3N_2I$ and can be represented by the most probable formula

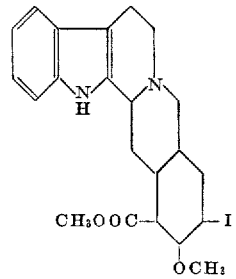

It can be converted into iodo-desoxydeserpidic acid by treatment with an aqueous-alcoholic solution of sodium hydroxide.

The methyl iodo-desoxydeserpidate acid is dissolved in glacial acetic acid and 10 parts by weight of zinc dust added in portions while the solution is refluxed. After refluxing for 18 hours, the reaction mixture is filtered through filtercel and the residue washed first with glacial acetic acid, then with dilute acetic acid, and finally with water. The filtrate and washings are combined and evaporated almost to dryness. The residue is taken up in chloroform and the chloroform solution is washed three times with water, then with dilute aqueous ammonia and then with water. The chloroform extract is evaporated to dryness and triturated with methanol. Crystals of methyl desoxydeserpidate are obtained which on recrystallization from methanol melt at 272–275°; $[\alpha]_D^{25} = -28 \pm 1°$ (chloroform). It has the empirical formula $C_{22}H_{28}O_3N_2$ and can be represented by the probable formula:

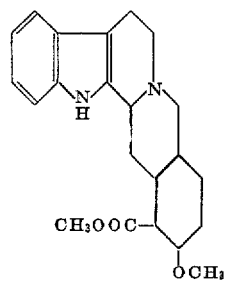

Iodo-desoxydeserpidic acid can be dehalogenated in a similar manner to yield desoxydeserpidic acid, which may also be obtained from methyl desoxydeserpidate by hydrolysis of the carbomethoxy group, for example with an aqueous-alcoholic solution of sodium hydroxide.

0.5 part by weight of methyl desoxydeserpidate thus obtained is suspended in 4.5 parts by volume of freshly distilled hydrobromic acid having a boiling point of 123–125°, and heated at 105° for one and one-half hours, being stirred by a stream of nitrogen. The material is dissolved during the reaction. Finally the reaction mixture is allowed to cool and then poured onto ice. The flocculent precipitate is filtered off and dissolved in a minimum of methanol. Addition of ammonia precipitates the free base. This mixture is added to the filtrate which has also been made basic and the whole extracted several times with n-butanol. The butanol extract is washed twice with water and then evaporated to dryness, thus yielding rauwolscinic acid having the empirical formula $C_{20}H_{24}O_3N_2$ and the most probable structural formula:

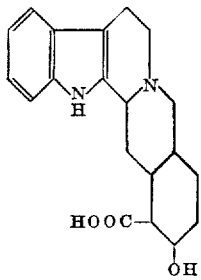

Rauwolscinic acid can also be obtained in a similar manner from the above described desoxydeserpidic acid.

For the preparation of rauwolscine, the above obtained rauwolscinic acid is dissolved in a minimum of methanol, a little ether is added and the mixture is allowed to react with an excess of diazomethane in ether for three hours, after which the initial precipitate is dissolved. After evaporation to dryness the residue is taken up in benzene and chromatographed on alumina (Woelm, neutral, activity II–III). A mixture of benzene-acetone (9:1) elutes crystalline material which on re-crystallization melts at 240–242°, and which is identical with rauwolscine (α-yohimbine), having the most probable formula:

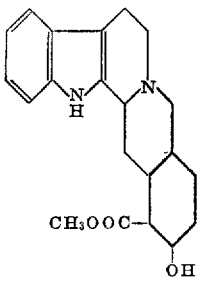

Instead of the above mentioned methyl iodo-desoxy-deserpidate, there can also be used methyl bromo-desoxy-deserpidate which can be obtained as follows:

0.5 part by weight of p-toluene sulfonyl methyl deserpidate and 0.5 part by weight of lithium bromide are refluxed overnight in 30 parts by volume of dry acetonitrile and the reaction mixture worked up in the same manner as given above for the corresponding iodo compound. Trituration of the residue from the evaporation of the chloroform extract yields crystals which on re-crystallization melt at 179–182° with decomposition. This material represents methyl bromo-desoxydeserpidate having the empirical formula $C_{22}H_{27}O_3N_2Br$ and the most probable structural formula:

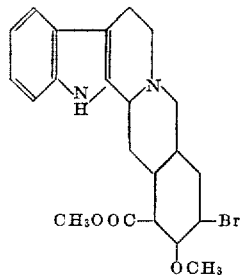

Methyl deserpidate used as starting material can be obtained as follows:

To 0.5 part by weight of deserpidine is added a solution of 0.05 part by weight of sodium in 25 parts by volume of methanol. The mixture is refluxed under nitrogen for one hour during which the deserpidine all dissolves. After cooling, the solution is concentrated in vacuo to a volume of about 10 parts by volume. 30 parts by volume of water are added and then concentrated hydrochloric acid in a dropwise manner until the solution is strongly acidic. It is then extracted with 15 parts by volume of ether and re-extracted with 3 portions each of 10 parts by volume of ether. The aqueous phase is then made basic with concentrated aqueous ammonia and extracted with 15 parts by volume of methylene chloride and re-extracted with 3 portions each of 10 parts by volume of methylene chloride. The combined methylene chloride extracts are dried over anhydrous potassium carbonate and concentrated in vacuo to give methyl deserpidate as a pale, yellow solid froth which analyzes for the empirical formula $C_{22}H_{28}O_4N_2$. In the same manner, by employing dry ethanol or butanol instead of methanol, the corresponding alkyl deserpidates are obtained.

Deserpidine itself can be prepared as follows: 500 parts by weight of dried, finely ground roots of *Rauwolfia canescens* are extracted batch-wise with methanol at its boiling point, using the following volumes and times, and filtering each extract while hot: 2,000 parts by volume, 1 hour; 1,000 parts by volume, 45 minutes; 1,000 parts by volume, 30 minutes; 1,000 parts by volume, 30 minutes. The extracts are combined and evaporated in vacuo to 75 parts by volume of thick syrupy solution. After the addition of 75 parts by volume of methanol and 150 parts by volume of acetic acid of 15 percent strength with adequate mixing, the solution is extracted with 2 portions each of 100 parts by volume of hexane. The combined hexane extracts are extracted with 15 parts by volume of acetic acid of 15 percent strength. The latter extract is added to the above acetic acid phase which is then extracted with 3 portions each of 75 parts by volume and 1 portion of 50 parts by volume of ethylene chloride. The first 3 extracts are combined and washed with 60 parts by volume of 2 N sodium carbonate solution and then with 60 parts by volume of distilled water. These washing solutions are saved and used for the washing of the 4th and final ethylene chloride extract. The combined ethylene chloride extracts are dried over sodium sulfate, filtered and evaporated in vacuo to a constant weight of a tan, frothy solid. 1 part by weight of this residue is dissolved in 1.5 parts by volume of warm methanol and the solution cooled to 5° C. for 18 hours, whereby crystallization of a mixture containing principally reserpine sets in.

0.665 part by weight of the above product is dissolved in 8 parts by volume of methylene chloride, treated with 0.05 part by weight of activated charcoal which is then removed by filtration, using 2 parts by volume of methylene chloride as a wash. While the methylene chloride is distilled off it is replaced by 6 parts by volume of methanol. The distillation is continued until the methylene chloride is removed and a volume of approximately 2 parts by volume of methanol remains. After standing over night at −5°, the crystals of impure reserpine are filtered and washed with three portions each of 0.25 part by volume of cold methanol. The mother liquor and wash from the above crystals is evaporated in vacuo to a tan solid residue. 0.85 part by weight of this is dissolved with warming in 2.1 parts by volume of acetone. Needles crystallize from the warm solution. After standing for 2 hours at room temperature, the crystals are filtered, washed with cold acetone, and dried in vacuo at 50° for several hours. 0.236 part by weight of these crystals are dissolved in boiling acetone, the solution concentrated to a volume of 1.7 parts by volume, cooled at room temperature, whereupon crystallization sets in. After standing at room temperature over night, the crystals are filtered, washed with cold acetone, and dried in vacuo at 50° for 5 hours, 0.143 part by weight of these crystals are dissolved in 0.5 part by volume of warm methanol. The crystals dissolve readily and from the solution there crystallize rapidly rosettes of tiny prismatic needles. After standing at room temperature over night, the crystals are filtered and washed with cold methanol. The thus obtained deserpidine melts at 228–232°.

Example 2

0.5 part by weight of methyl bromo-desoxydeserpidate are dissolved in 25 parts by volume of methanol to which have been added 0.05 part by weight of sodium hydroxide. After the addition of about 1 part by weight of Raney nickel, the mixture is hydrogenated at atmospheric pressure and room temperature. After approximately 1 mole of hydrogen has been absorbed, the reaction is stopped, the catalyst filtered off, and the methanolic solution concentrated to a small volume of about 5 parts by volume. On dilution with water, the base precipitates and is extracted with chloroform. The extract is washed with water, dried with anhydrous sodium sulfate and the solvent removed. The residue is crystallized from methanol to yield methyl desoxydeserpidate identical with that described in Example 1.

Example 3

1.5 parts by weight of 3,4,5-trimethoxy-benzoic acid is dissolved in 17 parts by volume of thionyl chloride and the solution refluxed for four hours. The excess of thionyl chloride is removed by distillation with toluene. The crude acid chloride is then dissolved in 5 parts by volume of pyridine, and 0.5 part by weight of rauwolscine is added. The mixture is allowed to stand for four days at room temperature. About 10 parts by volume of water are added gradually and the solvents then removed by distillation in vacuo. The residue is taken up in chloroform and the solution washed with dilute aqueous ammonia and water. After drying, the solvent is removed and the residue chromatographed on 18 parts by weight of alumina (Woelm, activity II–III) in benzene solution. The ester is eluted with benzene and is recrystallized from an acetone-water mixture. The thus obtained 3,4,5-trimethoxy-benzoyl rauwolscine melts at 237–239°. It has the empirical formula $C_{31}H_{36}N_2O_7$ and can be represented by the most probable formula:

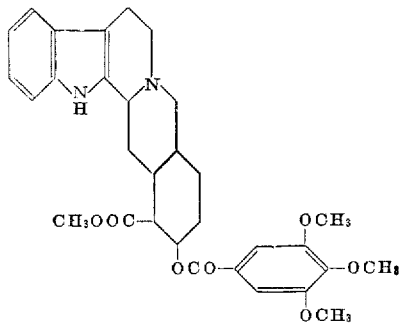

What is claimed is:
1. 18-halogeno-18-desoxydeserpidic acid.
2. Acid addition salts of the compound of claim 1.
3. Salts of the compounds of claim 1 with a metal selected from the group consisting of alkali and alkaline earth metals.
4. 18-bromo-18-desoxydeserpidic acid.
5. 18-iodo-18-desoxydeserpidic acid.
6. Acid addition salts of the compounds of claim 7.
7. Lower alkyl 18-halogeno-18-desoxydeserpidates.
8. Methyl 18-bromo-18-desoxydeserpidate.
9. Methyl 18-iodo-18-desoxydeserpidate.
10. 18-desoxydeserpidic acid.
11. Acid addition salts of the compound of claim 10.
12. Salts of the compound of claim 10 with a metal selected from the group consisting of alkali and alkaline earth metals.
13. Acid addition salts of the compounds of claim 14.
14. Lower alkyl 18-desoxydeserpidates.
15. Methyl 18-desoxydeserpidate.
16. A process for the preparation of rauwolscinic acid comprising treating methyl O-p-toluene sulfonyl-deserpidate with sodium iodide so as to replace the O-p-toluene sulfonyloxy group by iodine, treating the obtained methyl 18-iodo-18-desoxydeserpidate with zinc in glacial acetic acid so as to remove the iodine, and hydrolyzing the obtained methyl 18-desoxydeserpidate with hydrobromic acid so as to obtain rauwolscinic acid.
17. A process for the preparation of rauwolscinic acid which comprises treating a lower alkyl O-p-toluene sulfonyl-deserpidate with an alkali metal halide, treating the resulting lower alkyl 18-halogeno-18-desoxydeserpidate with a reducing agent selected from the group consisting of zinc in the presence of an acid and hydrogen in the presence of Raney nickel, to replace the halogen atom by hydrogen, and treating the lower alkyl 18-desoxydeserpidate thus obtained with concentrated aqueous hydrohalic acid so as to produce rauwolscinic acid.
18. A process for the preparation of rauwolscinic acid which comprises treating a lower alkyl O-p-toluene sulfonyl-deserpidate with an alkali metal halide, treating the resulting lower alkyl 18-halogeno-18-desoxydeserpidate with an alkaline hydrolysis agent, treating the resulting 18-halogeno-18-desoxydeserpidic acid with a reductive agent selected from the group consisting of zinc in the presence of an acid and hydrogen in the presence of Raney nickel, to replace the halogen atom by hydrogen, and treating the 18-desoxydeserpidic acid thus obtained with concentrated aqueous hydrohalic acid so as to produce rauwolscinic acid.

References Cited in the file of this patent

UNITED STATES PATENTS

| | | |
|---|---|---|
| 684,650 | Spiegel | Oct. 15, 1901 |
| 716,776 | Spiegel | Dec. 23, 1902 |
| 996,274 | Muller | June 27, 1911 |

OTHER REFERENCES

Beil, vol. XXV, 2nd supplement, pages 200–212.
Janat et al.: Bull. Soc. Chem., vol. 16 (1949), pages 509–515.
Chatterjee: Journal Indian Chem. Soc., vol. 28, No. 1 (1951), pages 29–33.

UNITED STATES PATENT OFFICE

CERTIFICATE OF CORRECTION

Patent No. 2,809,199                                    October 8, 1957

Harold Belding MacPhillamy

It is hereby certified that error appears in the printed specification of the above numbered patent requiring correction and that the said Letters Patent should read as corrected below.

Column 1, lines 18 and 50, for "Soc. 18, 33" read --Soc. 18, 33--; line 24, the formula designation "I" appearing at the upper left-hand side of the structural formula should appear instead at the lower left-hand side of said formula; column 4, line 25, for "acid is dissolved" read --is dissolved--.

Signed and sealed this 3rd day of June 1958.

(SEAL)
Attest:

KARL H. AXLINE
Attesting Officer

ROBERT C. WATSON
Commissioner of Patents